United States Patent [19]

Ebeling et al.

[11] 4,068,831
[45] Jan. 17, 1978

[54] APPARATUS FOR THE PRODUCTION OF FOAM MATERIALS CONTAINING A FILLER MATERIAL

[75] Inventors: Wilfried Ebeling, Cologne; Klaus Schulte, Leverkusen, both of Germany

[73] Assignee: Bayer Aktiengesellschaft, Leverkusen, Germany

[21] Appl. No.: 717,813

[22] Filed: Aug. 26, 1976

[30] Foreign Application Priority Data

Sept. 13, 1975 Germany .............................. 2540934

[51] Int. Cl.² .......................... B01F 7/08; B01F 15/02
[52] U.S. Cl. .................................. 366/156; 366/290; 366/323
[58] Field of Search ................... 259/5, 6, 7, 8, 9, 10, 259/21–26, 37, 40, 41, 42–46; 222/145

[56] References Cited

U.S. PATENT DOCUMENTS

| | | | |
|---|---|---|---|
| 2,900,176 | 8/1959 | Krogel | 259/5 |
| 3,067,987 | 12/1962 | Ballou | 259/7 |
| 3,452,965 | 7/1969 | Leister | 259/41 |
| 3,572,647 | 3/1971 | Staheli | 259/25 |
| 3,682,447 | 8/1972 | Zucker | 259/DIG. 30 |
| 3,843,100 | 10/1974 | Haas | 259/25 |
| 3,865,355 | 2/1975 | Claire | 259/21 |
| 3,929,319 | 12/1975 | Willemsen | 259/6 |

*Primary Examiner*—Robert W. Jenkins
*Attorney, Agent, or Firm*—Gene Harsh; Joseph C. Gil; William E. Parry

[57] ABSTRACT

An apparatus is disclosed for producing foam from two or more flowable chemical components where a filler material, such as waste foam, is added to one or more of the components prior to mixing and foaming. The charging mechanism for mixing the filler and component comprises a component feed pipe and a filler feed screw having a tubular housing. The discharge opening of the feed screw projects axially into the feed pipe so as to form an annular slot between the feed pipe and the housing to which slot the pipe from the dosing pump is connected, one end of the feed pipe being sealed to the housing.

6 Claims, 3 Drawing Figures

APPARATUS FOR THE PRODUCTION OF FOAM MATERIALS CONTAINING A FILLER MATERIAL

BACKGROUND OF THE INVENTION

The present invention relates to an apparatus for the production of foam materials containing a filler material, in particular foam materials, containing waste foam materials produced from at least two flowable chemical components in addition to the filler material.

In the production of foam materials and their further processing, substantial quantities of waste foam materials are produced. The disposal or re-use of this waste has hitherto presented difficulties. For example, finished blocks of foam material have to be trimmed on all sides because manufacturing conditions necessarily produce defective outer edge zones. The block foam may also be cut, for example for upholstery purposes. Of course, such waste and cuttings can be cut into small pieces to form flock, which can be used as a filling material for cushions, toy animals, and insulation purposes. However, the demand for such material does not nearly correspond to the quantities of waste produced.

It has therefore already been attempted to cut up waste from material in grinders to form flock, moisten it in rotating drums with adhesives and subsequently compress the waste in molds. The moldings thus produced, however, are generally hard and of low quality and value. Waste from cellular plastic skins or compacted bottom zones cannot be used, only pure foam waste can be used in this way.

It has also been attempted to grind waste foam material into powder or granulate particles, mix these particles with a chemical such as polyol, and feed them into a foam production process. The method previously used has been to grind the waste foam material into the finest possible powder and to thicken the polyol with it in a mixing container. This mixture is then fed through pumping and dosing systems to a mixing head. Problems are presented in the dosing pumps because of the highly viscous nature of the mixture. Another particular disadvantage in preparing fine grained or powdery filler materials is the electrostatic charge which is generated, particularly in connection with plastic filler materials. Because of their electrostatic charge, the fillers tend to adhere to and clog pipes.

The object of the present invention therefore is to provide an apparatus with which filler materials, in particular waste foam materials, can be recycled to the production process of foam material, in which the method of addition eliminates the filler materials tendency to clog pipes, and in which the quality of the foam material produced can retain the high standard desired in spite of the filler material.

DESCRIPTION OF THE INVENTION

According to the invention, there is provided an apparatus for the production of foam materials containing a filler material, such as waste foam, from at least two flowable chemical components in addition to the filler material. The apparatus comprises a storage container for each component, a pipe leading from each container to a mixing head via a dosing pump, and a charging mechanism for powdery to fine-grained filler material arranged in at least one of the pipes between the mixing head and the dosing pump. the charging mechanism comprises a component feed pipe and a feed screw having a tubular housing for the filler material. The discharge opening of the feed screw projects axially into the feed pipe so as to form an annular slot between the feed pipe and the housing to which slot the pipe from the dosing pump is connected, one end of the feed pipe being sealed to the housing.

By virtue of this arrangement, the component, for example, the polyol, envelops the filler material flow in the form of a coating which is supplied by the feed screw in such a way that the filler flow cannot come into contact with the wall of the short feed pipe in a dry condition. Further along, the filler material mixes with the component, is thereby wetted, and loses its electrostatic charge and self-adhesion. It is self-evident, that the finer the particles of the filler material, the better they can be mixed to guarantee better distribution in the foam material. The flow of the components within the short feed pipe can take place either axially or as a twist flow, which rotates along the inner wall. In this case the feed of the filler material is supported by the suction effect created.

According to a particular embodiment of the invention the short feed pipe of the charging mechanism for filling material opens out directly into the mixing head. This embodiment is particularly applicable if the filling material is distributed fairly quickly in the components or if the mixing head is equipped with an agitator mechanism, which accelerates the distribution. With this embodiment, the mixing chamber should preferably be designed so as to be sufficiently long that the upper part of the mixing chamber serves for the pre-mixing of the components with the filler material, while the lower part is reserved for mixing this mixture with the second component.

The short feed pipe can also be constructed to be so long that as a result of the longer flow path a sufficient pre-mixing of the components with the filler material takes place, before the mixture enters the mixing head.

According to a further embodiment the charging mechanism for filler material opens into a pre-mixer, from which a connection pipe leads to the mixing head. The pre-mixer may be, for example, a through-run mixer with an agitator mechanism. This embodiment is particularly suitable for fitting to existing apparatus.

According to a further particular embodiment, the feed screw is provided with a pitch volume which increases towards the discharge opening. In this way excessive compression of the compressible filler material is prevented. The filler material can be re-dosed almost without pressure because the energy of the flowing components to the mixing chamber is sufficient as a mixture and even in an unmixed state to pump against a pressure of between 0 to 10 bars, which for example corresponds to the mixing chamber pressure. Of course it is also possible to operate at higher pressures.

DETAILED DESCRIPTION OF THE DRAWINGS

Figure 1:
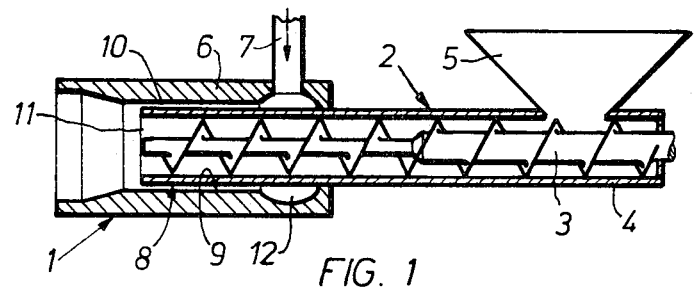
FIG. 1 shows a charging mechanism for the filler material in longitudinal sections.

As shown in FIG. 1, the charging mechanism 1 comprises a feed screw 2 with a screw shaft 3, housing 4 and charging funnel 5 and also comprises a short feed pipe 6, into which pipe 7 for one component opens. The feed screw 2 is centrally arranged in relation to the short feed pipe 6 and stretches far into the latter. Between the outer wall 8 of the housing 4 and the inner wall 9 of the short feed pipe 6, an annular slot 10 is present. At its opposite end is the exit aperture 11 of the feed screw 2. Pipe 7 opens into an annular channel-shaped extension 12 of the annular slot 10. The screw shaft 3 has a pitch volume which increases towards the exit opening 11. The annular slot 10 must be sufficiently long that a component leaving it is distributed uniformly on the inner wall 9 of the short feed pipe 6, so that the flow of filler material supplied by the feed screw 2 is enveloped by the component before mixing takes place.

Figure 2:
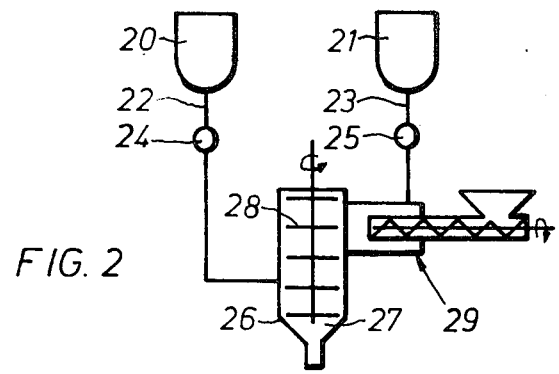
FIG. 2 shows a first embodiment of the apparatus with a charging mechanism opening into the mixing head.

As shown in FIG. 2, the apparatus comprises storage containers 20, 21 for the isocyanate and polyol components. Dosing pumps 24, 25 are arranged in pipes 22, 23. The pipe 22 leads directly to a mixing head 26 and opens into the lower part of a mixing chamber 27 arranged therein, which is provided with an agitator mechanism 28. The pipe 23, however, leads into a charging mechanism 29, which in construction corresponds to that of FIG. 1 The charging mechanism 29 opens into the upper part of the mixing chamber 27, so that good pre-mixture of the polyol with the powdered foam material supplied as filler material takes place, before the isocyanate component is added.

Figure 3:
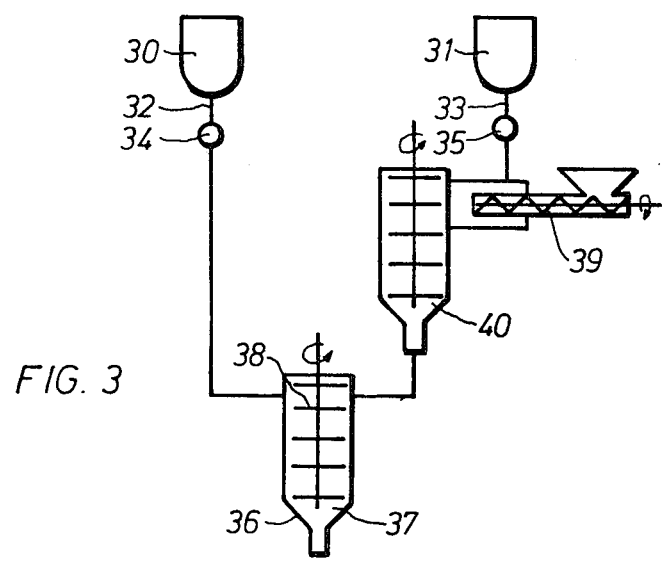
FIG. 3 shows a second embodiment of the apparatus with a charging mechanism opening into a pre-mixer.

As shown in FIG. 3, the apparatus consists of storage containers 30, 31, for the isocyanate and polyol components. Dosing pumps 34, 35 are arranged in pipes 32, 33. The pipe 32 leads directly into a mixing head 36. A pre-mixer 40 with a charging mechanism 39 for the filler material is arranged in the pipe 33 for the polyols. The first section of pipe 33 opens into the charging mechanism 39, which is constructed in a manner similar to that illustrated in FIG. 1. The second section of the pipe 33 is connected to the pre-mixer 40 and opens into the mixing chamber 37 which is provided with an agitator mechanism 38. In this embodiment, a pre-mix of polyol and powder-form foam material enters mixing head 36.

What is claimed is:

1. An apparatus for the production of foam materials containing a filler material, such as waste foam material, from at least two flowable chemical components in addition to the filler material, comprising a storage container for each component, a pipe leading from each container to a mixing head via a dosing pump, and a charging mechanism for powdery to fine-grained filler material arranged in at least one of the pipes between the mixing head and the dosing pump, said charging mechanism comprising a component feed pipe, and a feed screw for the filler material having a tubular housing having a discharge opening, said tubular housing positioned inside said feed pipe and spaced inwardly therefrom, the discharge opening of said housing projecting axially into said feed pipe, so as to form an annular slot between the feed pipe and the housing to which slot a pipe from the dosing pump is connected, one end of the feed pipe being sealed to the housing.

2. The apparatus of claim 1, wherein said feed pipe opens directly into the mixing head.

3. The apparatus of claim 1, wherein said feed pipe opens into a pre-mixer from which a connecting pipe leads to the mixing head.

4. The apparatus of claim 1, wherein the screw shaft of the feed screw has a pitch volume which increases towards the discharging opening.

5. The apparatus of claim 2, wherein the screw shaft of the feed screw has a pitch volume which increases towards the discharging opening.

6. The apparatus of claim 3, wherein the screw shaft of the feed screw has a pitch volume which increases towards the discharging opening.

* * * * *